United States Patent [19]

Grosse-Scharmann et al.

[11] Patent Number: 4,646,941
[45] Date of Patent: Mar. 3, 1987

[54] MECHANISM FOR DISCHARGING GRANULAR MATERIAL

[75] Inventors: Franz Grosse-Scharmann; Bernd Gattermann, both of Hude; Rudolf Gehrke, Papenburg, all of Fed. Rep. of Germany

[73] Assignee: Amazonen Werke H. Dreyer GmbH & Co. KG, Hasbergen-Gaste, Fed. Rep. of Germany

[21] Appl. No.: 723,112

[22] Filed: Apr. 15, 1985

[30] Foreign Application Priority Data

Apr. 14, 1984 [DE] Fed. Rep. of Germany ....... 3414177

[51] Int. Cl.$^4$ .................... G07F 13/00; A01C 1/00
[52] U.S. Cl. ................................. 222/23; 111/1; 221/2; 239/74; 406/35
[58] Field of Search .............. 111/1, 34, 77, 3, 2; 406/10, 14, 19, 21, 31, 35, 61, 77, 135; 198/461, 638, 642, 503, 956; 221/2–10; 222/23; 239/74

[56] References Cited

U.S. PATENT DOCUMENTS

| 474,425 | 5/1892 | Updike | 111/1 |
| 2,486,117 | 10/1949 | Clark | 198/303 |
| 2,812,732 | 11/1957 | Meisdalen | 111/34 |
| 3,253,739 | 5/1966 | Martin | 111/77 X |
| 3,804,036 | 4/1974 | Seifert | 111/7 X |
| 3,881,631 | 5/1975 | Loesch et al. | 111/1 X |
| 3,912,121 | 10/1975 | Steffen | 111/1 X |
| 3,989,311 | 11/1976 | Debrey | 111/1 X |
| 4,122,974 | 10/1978 | Harbert | 111/1 X |
| 4,164,669 | 8/1979 | Knepler | 111/1 X |
| 4,238,790 | 12/1980 | Balogh et al. | 111/1 X |
| 4,257,340 | 3/1981 | Mickelsson et al. | 111/1 |

FOREIGN PATENT DOCUMENTS

| 1043173 | 11/1978 | Canada | 111/77 |
| 2038732 | 2/1971 | Fed. Rep. of Germany | 111/77 |
| 2212769 | 9/1973 | Fed. Rep. of Germany | 111/77 |
| 2901767 | 7/1979 | Fed. Rep. of Germany | 111/1 |
| 957161 | 5/1964 | United Kingdom | 221/10 |
| 1502947 | 3/1978 | United Kingdom | 111/1 |
| 1041057 | 9/1983 | U.S.S.R. | 111/34 |

Primary Examiner—James R. Feyrer
Attorney, Agent, or Firm—Sprung Horn Kramer & Woods

[57] ABSTRACT

Mechanism for discharging granular material, especially seed and fertilizer, and having a bin and seed-flow regulators that variable amounts of material can be supplied to the ground through, whereby a sensor that detects the amount of material or number of grains of material discharged through that device is positioned in the vicinity of at least one flow regulator. To improve the sensor's detection of the amount or number of grains of material, a flow accelerator (8) accelerates the grains (22) of material toward the sensor (15) between the flow regulator and the sensor (FIG. 1).

16 Claims, 6 Drawing Figures

MECHANISM FOR DISCHARGING GRANULAR MATERIAL

BACKGROUND OF THE INVENTION

The invention relates to a mechanism for discharging granular material especially seed and fertilizer, and having a bin and seed-flow regulators through which variable amounts of material can be supplied to the ground, with a sensor that detects the amount of material or number of grains of material discharged through that device in positioned in the vicinity of at least one flow regulator.

A mechanism of this type is known from U.S. Pat. No. 3,422,776. A regulated amount of grains falls on a sensor plate 14 below the flow regulator and deflect the plate as they strike. This generates a pulse that is conveyed to a processing circuit. The drawback of the mechanism is that only large and heavy grains can activate the sensor plate sufficiently to generate an unambiguous signal.

The object of the present invention is to improve the sensor's detection of the amount or number of grains of material.

SUMMARY OF THE INVENTION

This object is attained in accordance with the invention a flow accelerator accelerates the grains of material toward the sensor between the flow regulator and the sensor. The grains supplied from or metered out by the flow regulator are accordingly accelerated essentially more powerfully than by gravity alone. The calculated acceleration of the metered grains of material toward the sensor make them strike it at sufficient energy and speed to generate a signal powerful enough to be processed. Even grains that strike the sensor at rapid intervals or several simultaneously can be detected. Since the grains are accelerated toward the sensor, they will be moving in a prescribed direction and the signal generated by each impact can be analyzed. Furthermore, accelerating the grains will suppress any ambient interference signals.

In one preferred embodiment of the invention, the flow accelerator consists of a blower and constriction. This type of accelerator takes up very little space and can even be subsequently mounted on existing mass-produced machines with little expenditure for design and construction.

The accelerator is designed to be built in in various positions, and its low overall height, with the accelerated-flow channel extending at least approximately horizontally, is a special advantage because seed drills for example have only a limited amount of vertical space between the flow regulator and the sowing share available and the freedom of motion of the share must not be restricted.

In another embodiment of the invention the flow accelerator consists of at least one conveyor belt. This type of flow accelerator is especially appropriate for granular materials coated with powdered materials.

To prevent the grains being accelerated toward the sensor by the flow accelerator from being impeded by grains that have already struck the sensor, the sensor is positioned in accordance with the invention at an angle of less than 90° and more than 0° to the direction of accelerated flow from the flow accelerator.

Especially practical, particularly when the flow accelerator is horizontal, is an angle of between 45° and 70°.

To prevent the air that accelerates the grains from contaminating the results of their impact on the sensor, the sensor is mounted on a sensor plate, and there are perforations in the plate outside the zone where the grains strike it. The perforations allow the air to escape. Air escape can also be promoted by at least one air-escape slot at the side of the plate. These measures at least prevent air turbulence from building up and impeding acceleration or affecting the impact of the grains against the sensor plate.

BRIEF DESCRIPTION OF THE DRAWINGS

Further details will be evident from the subsidiary claims, the description and the drawings, in which

DETAILED DESCRIPTION OF THE INVENTION

Figure 1:
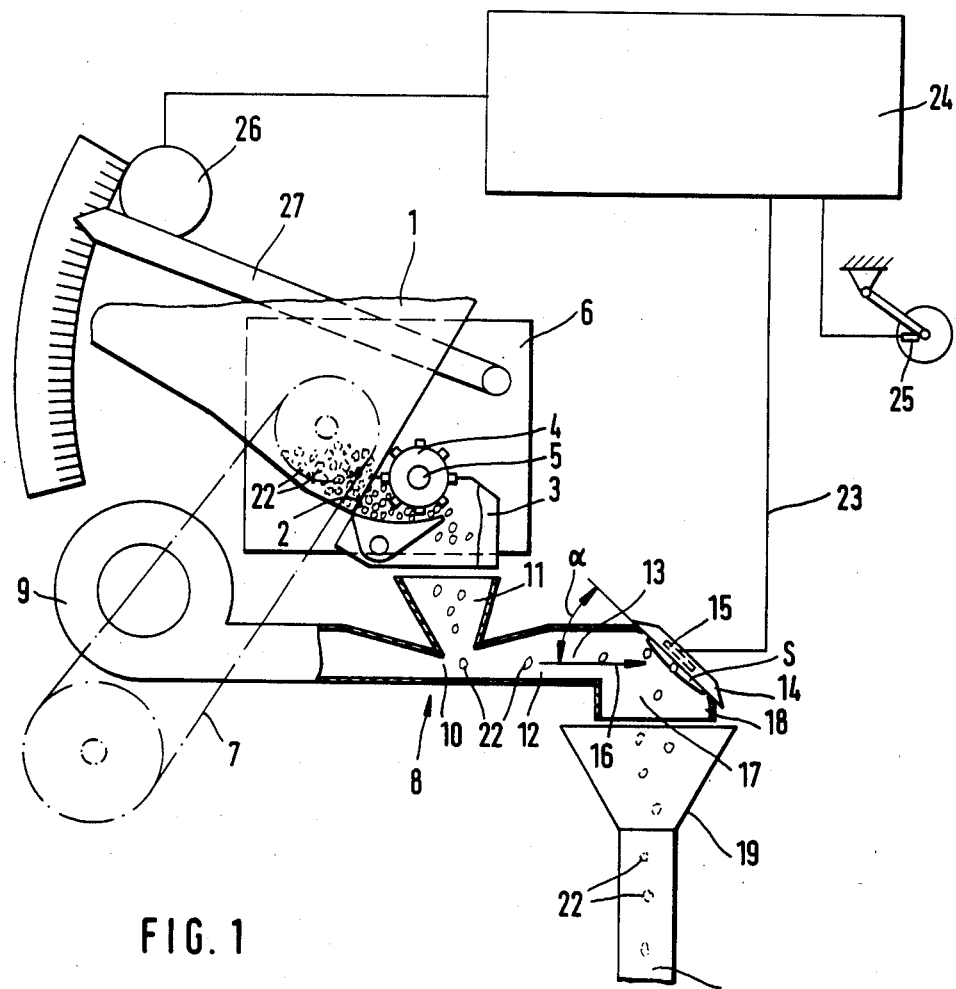
FIG. 1 is a side view illustrating the situation of a flow accelerator in a seeder in principle.

A bin 1 for a seed drill has outlets 2 at the bottom. In front of the outlets is a flow-regulator housing 3 with flow regulators 4 in the form of lifter wheels. Lifter-wheel flow regulators 4 are fixed on a flow-regulation shaft 5 and are driven by a source of power through a continuously adjustable regulating drive mechanism 6 and a chain drive 7. Below flow-regulator housing 3 is a flow accelerator 8 consisting of a powered blower 9, of an injector constriction 10, of an intake hopper 11, and of an accelerated-flow channel 13 in the form of a duct 12. At the end of accelerated-flow channel 13 a sensor plate 14 with a sensor 15 mounted at an angle $\alpha$ to the direction 16 of accelerated flow through accelerated-flow channel 13. Angle $\alpha$ is approximately 45°. Below sensor plate 14 is the mouth 17 of channel 13 and an outlet 18. Directly below is an intake funnel 19 that leads to a seed pipe 20 that leads in turn to a sowing share 21. Since all the flow regulators 4 on the machine are identical and driven by the same shaft 5, the flow accelerator 8 and sensor 15 need to be positioned under only one flow regulator. Beside sensor plate 14 is an air-escape slot S that allows the air coming from blower 9 to escape.

How flow accelerator 8 operates will now be described.

Measured amounts or a measured number of the grains 22 of seed in bin 1 are supplied to sowing shares 21 from each flow regulator 4 per unit traveled by the seed drill and thus deposited in the soil. The flow regulator 4 that flow accelerator 8 is positioned under channels the metered grains 22 of seed through intake hopper 11 to injector constriction 10, where they are picked up by the flow of air generated by blower 9 and accelerated relatively powerfully through accelerated-flow channel 13 to sensor 15. The accelerated grains strike sensor plate 14 with a relatively high momentum. Their impact on the plate generates pulses, signals, or oscillations that are picked up by sensor 15. Once they have struck plate 14, grains 22 are channeled down through the angle α that the plate is mounted at in terms of their direction 16 of accelerated flow to the intake funnel 19 of seed pipe 20, whence they drop free through sowing share 21 into the furrow produced by the share.

The pulses, signals, or oscillations picked up by sensor 15 are transmitted to a microprocessor 24 over a line 23. Also connected to microprocessor 24 is an odometer 25 that determines the distance traveled by the seed drill, with the results being fed to the microprocessor. Microprocessor 24 computes the actual number of grains 22 of seed supplied to sowing share 21 by flow regulator 4. The microprocessor then compares the number of grains actually applied in this way with a stored reference. When the actual value differs from the reference, microprocessor 24 releases appropriate signals to servomotor 26, which then adjusts the control lever 27 of regulating drive mechanism 6 in such a way that flow regulator 4 will increase or decrease the number of grains flowing through until the desired number per distance traveled is arrived at. This procedure is continuous.

Figure 2:
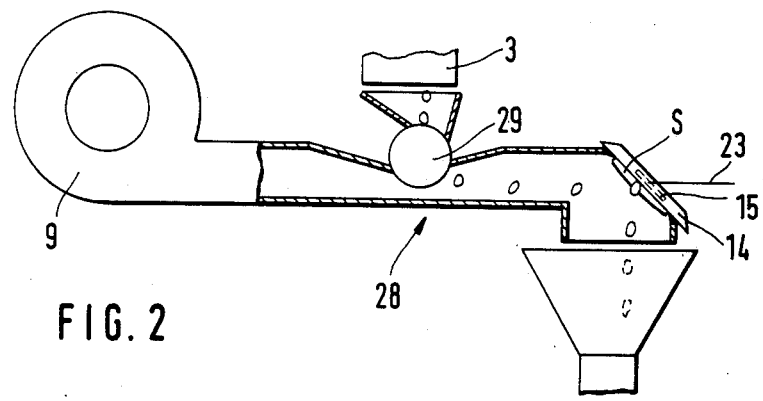
FIG. 2 is a side view illustrating the situation of another embodiment of a flow accelerator in principle.

The flow accelerator 28 illustrated in FIG. 2 differs from the flow accelerator 8 in FIG. 1 only in the type of constriction. The constriction in flow accelerator 28 is created by a compartmented feeder wheel 29. Otherwise, flow accelerator 28 operates exactly like flow accelerator 8.

Figure 3:
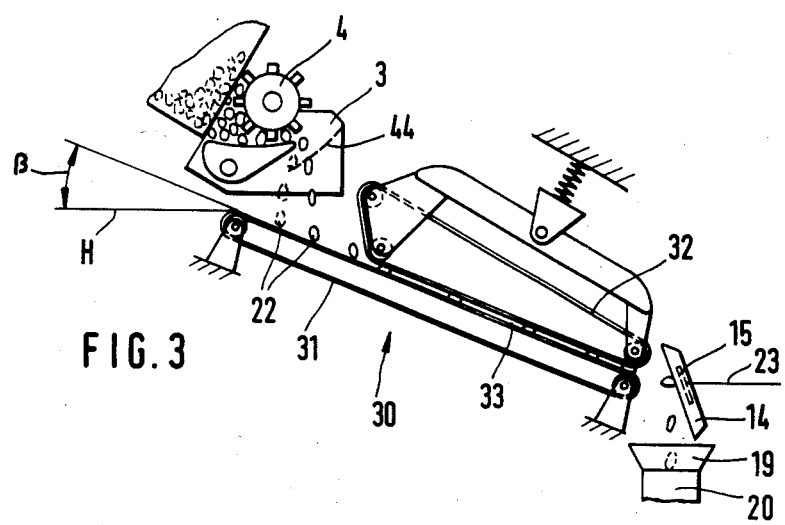
FIG. 3 is a side view illustrating the situation of a third embodiment of a flow accelerator in principle.

The flow accelerator 30 illustrated in FIG. 3 is also positioned below the flow regulator of a seed drill and is in the form of two stacked conveyor belts 31 and 32. Lower conveyor belt 31 extends from the front of flow regulator 4 to the intake funnel 19 of a seed pipe 20. Upper conveyor belt 32 extends from behind flow regulator 4 to intake funnel 19. Upper conveyor belt 32 is spring tensioned against lower conveyor belt 31 with the facing sides of the belts in contact or close proximity. Conveyor belts 31 and 32 are driven rapidly enough to accelerate the grains 22 of seed metered out by flow regulators 4 and secured between the facing sides of the belts toward sensor 15. The accelerated grains 22 are hurled at high momentum against sensor plate 14 and diverted down through intake funnel 19, whence they are deposited in the soil through a sowing share. The accelerated-flow channel 33 that consists of conveyor belts 31 and 32 is positioned on the seed drill at an angle β, which is between 0° and 45° to the horizontal H.

Flow accelerator 30 operates exactly like the flow accelerator 8 illustrated in FIG. 1 in terms of processing the seed-impact pulses picked up by the sensor and of governing the amounts of seed applied.

Figure 4:
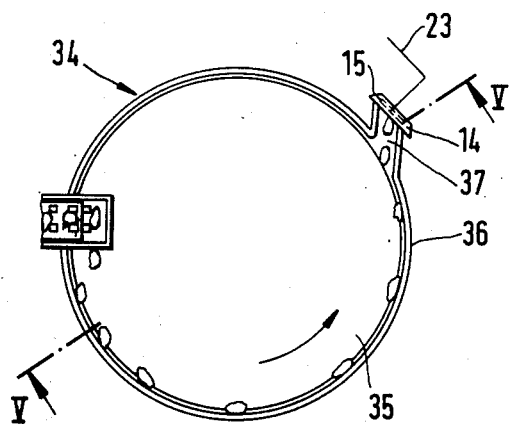
FIG. 4 is a top view illustrating the situation of a fourth embodiment of a flow accelerator in principle.
Figure 5:
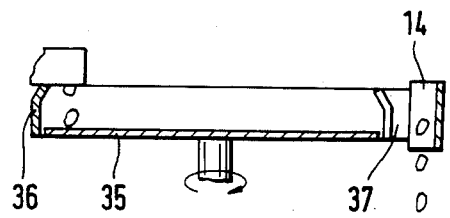
FIG. 5 is a section through the same embodiment along the line V—V in FIG. 4.

The flow accelerator 34 illustrated in FIGS. 4 and 5 has a rotating powered centrifuge disk 35 mounted in a stationary ring 36. Ring 36 has in the vicinity of sensor 15 an aperture 37 extending toward the sensor. The grains 22 of seed metered out by flow regulator 4 drop onto and are accelerated by centrifuge disk 35 to sensor 15 through aperture 37. The grains strike sensor plate 14 with a high momentum and the resulting signals are supplied to a microprocessor that processes them and governs the flow regulator as described in the foregoing with reference to FIG. 1.

Figure 6:
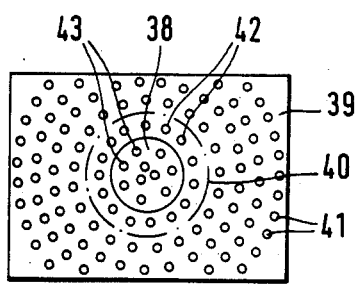
FIG. 6 illustrates a sensor plate with a sensor.

The sensor 38 illustrated in FIG. 6 is mounted on a sensor plate 39. Outside the zone 40, indicated by the dot-and-d ash circle, where the seeds strike, perforations 41 are distributed uniformly around sensor 38. The air from the blower can escape through perforations 41, preventing turbulence upstream of sensor plate 39. To improve air escape even further, there are additional perforations 42 outside impact zone 40 and even in sensor 38 itself. Perforations 41, 42, and 43 can be positioned parallel or at various angles in sensor plate 39 to optimize the escape of the air.

A retardation plate 44 represented by a broken line in mounted in the housing 3 of the flow regulator illustrated in FIG. 3. Retardation plate 44 partly occludes half the cross-section of flow-regulator housing 3 and to some extent singles out the grains 22 of seed dropping in bunches from flow regulator 4 because the grains falling on plate 44 have to travel a somewhat longer path than those that do not fall on it.

We claim:

1. In a mechanism for discharging granular material, especially seed and fertilizer, and having a bin and seed-flow regulators through which variable amounts of material are supplied to the ground by gravity and a sensor for producing a signal for detecting the amount of material discharged through the regulators, the improvement comprising means for positively enhancing the signal quality of the sensor by acceleration of material contacting same including the sensor being positioned downstream of the at least one regulator and further comprising material flow accelerating means disposed between the flow regulator and the sensor for accelerating the grains of material to a speed greater than that obtained by gravity and toward the sensor and into contact therewith and means for directing the material from the sensor to the ground solely under the force of gravity.

2. The mechanism as in claim 1, wherein the flow accelerating means comprises of a blower having an outlet and means forming a constriction in the blower outlet.

3. The mechanism as in claim 2, wherein the means forming the constriction comprises an injector tube.

4. The mechanism as in claim 2, wherein the means forming the constriction comprises a compartmented feeder wheel.

5. The mechanism as in claim 4, wherein the flow accelerating means further comprises an accelerated-flow channel extending at least approximately horizontally.

6. The mechanism as in claim 1, wherein the flow accelerating means further comprises an accelerated-flow channel positioned at an angle of from to 0° to 45° to the horizontal.

7. The mechanism as in claim 1, wherein the flow accelerating means comprises at least one conveyor belt.

8. The mechanism as in claim 7, wherein the flow accelerating means comprises two conveyor belts with facing sides in at least close proximity.

9. The mechanism as in claim 1, wherein the flow accelerating means comprises a rotating centrifuge disk.

10. The mechanism as in claim 9, wherein the centrifuge disk is mounted in a ring and the ring has an aperture in the vicinity of the sensor extending toward the sensor.

11. The mechanism as in claim 1, wherein the sensor is positioned at an angle of less than 90° and more than 0° to the direction of accelerated flow from the flow accelerating means.

12. The mechanism as in claim 11, wherein the angle is between 45° and 70°.

13. The mechanism as in claim 1, wherein the sensor is mounted on a sensor plate having perforations in the outside a zone where the grains strike it.

14. The mechanism as in claim 13, wherein the perforations are distributed uniformly around the sensor plate.

15. The mechanism as in claim 13, wherein the sensor has perforations.

16. The mechanism as in claim 13, wherein there is at least one air-escape slot at the side of the sensor plate.

* * * * *